(No Model.)
V. BENZ.
GATE.
No. 546,805. Patented Sept. 24, 1895.
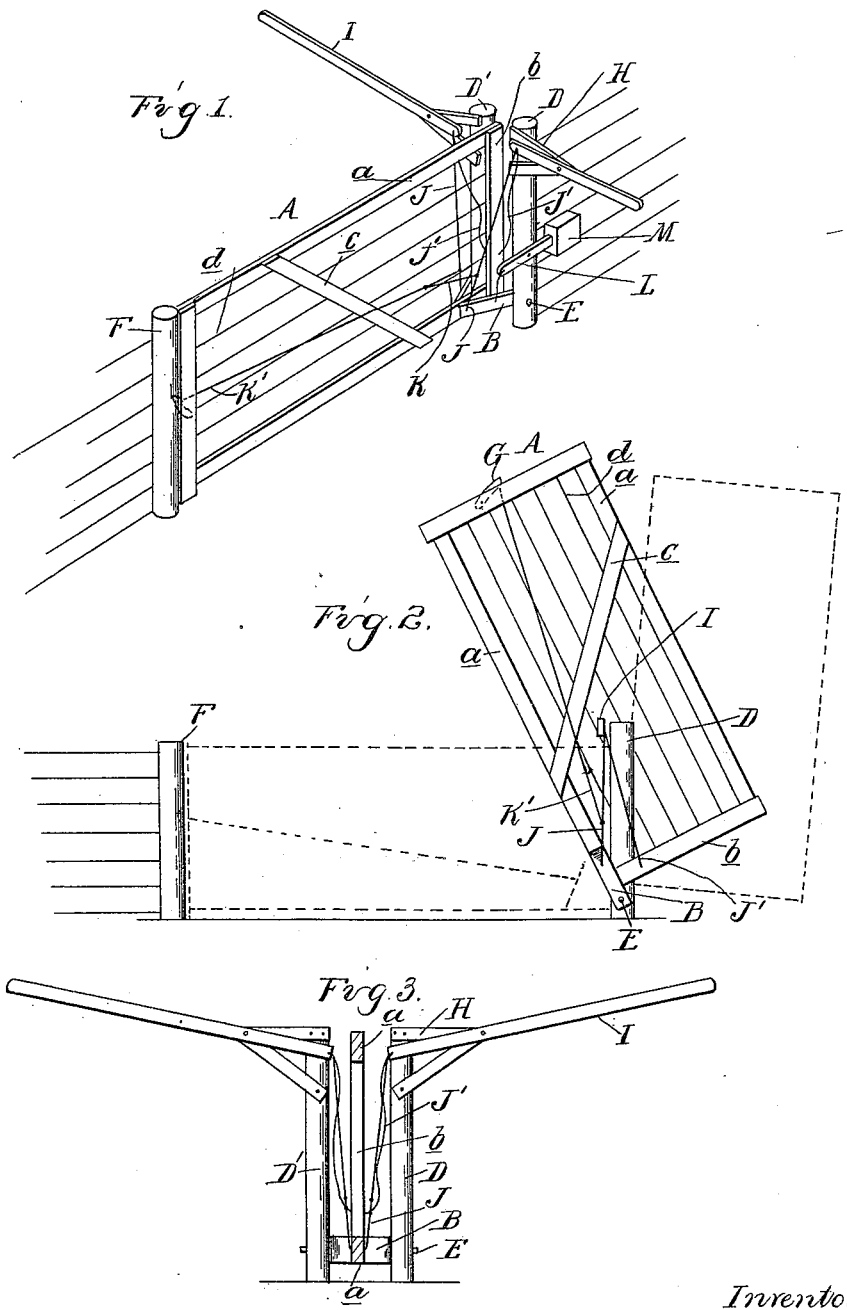
Witnesses
A. L. Hobby
O. F. Barthel
Inventor
Victor Benz
By Thos. S. Sprague & Son
Attys.

UNITED STATES PATENT OFFICE.

VICTOR BENZ, OF DEXTER, MICHIGAN.

GATE.

SPECIFICATION forming part of Letters Patent No. 546,805, dated September 24, 1895.

Application filed March 15, 1895. Serial No. 541,854. (No model.)

*To all whom it may concern:*

Be it known that I, VICTOR BENZ, a citizen of the United States, residing at Dexter, in the county of Washtenaw and State of Michigan, have invented certain new and useful Improvements in Gates, of which the following is a specification, reference being had therein to the accompanying drawings.

The invention relates to the construction of a farm-gate and to the peculiar construction, arrangement, and combination of the various parts, all as more fully hereinafter described.

In the drawings, Figure 1 is a perspective view of a gate embodying my invention. Fig. 2 is a side elevation showing the gate open. Fig. 3 is a vertical section through the gate near the pivot-post.

A is a gate. I have shown it formed of a rectangular frame comprising top and bottom bars $a$ and end bars or posts $b$, a brace $c$, and wires $d$. Near the pivoted end of the bottom bar are secured, on opposite sides, the inclined braces B, which spread sufficiently to bear against the inner faces of the posts D D', which form the pivot-posts for the gate.

E is a pivot bolt or rod running through the base of the two posts and through the ends of the two braces B, which thus form the pivot-blocks for the gate. These braces give a wide bearing for the pivotal point without adding materially to the expense, and at the same time brace the gate on its pivot to prevent side motion or "wabbling" in its horizontal or vertical position or in moving it.

F is the latch-post, with which the spring-latch G on the gate is adapted to engage.

At the top of the posts D D' are the outwardly-extending brackets H, in the ends of which are pivoted the levers I, the inner ends of which extend inside the posts, while the outer ends extend some distance away from the gate on opposite sides. To the inner ends of these levers are attached the cords, wires, or chains J J'. The cords J extend to and are attached to the inner ends of the braces B. The cords J' extend nearly to the bottom of the vertical bar or end post $b$ of the gate, to which they are secured at a point above the pivot E and serve to hold the gate in its open or tilted position.

K are cords connecting the cords J with the latch-cord K', which connects to the spring-latch.

L is a lever pivoted to one of the posts D D', having a weight M on one end and connected at the other end to one of the braces B.

The parts being thus constructed and arranged, they are intended to operate as follows: The gate being closed, the parts in the position shown in Fig. 1, the operator pulling down on either of the levers I will tighten the cord J, and thus through the connections described first withdraw the latch. Further movement of the lever will rock the gate upon its pivot to the position shown in full lines in Fig. 2. In this position both cords J J' would be taut. To prevent this the operator either gives a quick hard pull in starting, or just before reaching the point shown in full lines in Fig. 2, which will throw the gate beyond the central position into the position shown in dotted lines, Fig. 2. This position will maintain the cord J' taut, so that when desired a pull on the lever will rock the gate closed, the counterweighted lever preventing it closing with too great a force.

The braces B keep the gate from side motion. The brackets at the top of the posts on which the levers are pivoted enable me to have the posts near together, which enables me to use the braces B and also simplifies the whole construction.

What I claim as my invention is—

The combination of the gate, the braces B, the separated posts D D', the pivot rod or bolt passing through the braces and the posts, the brackets extending outwardly from the top of the posts, the levers pivoted in the outer ends of said brackets, the cords J, connected to the inner ends of said levers and to the braces, the cords J' connected to the inner ends of the levers, and to the gate at a point above its pivot, the gate latch, the latch cords connecting from the cords J to the latch, the weighted lever pivoted to the post D, and the flexible connection between the gate and lever, substantially as described.

In testimony whereof I affix my signature in presence of two witnesses.

VICTOR BENZ.

Witnesses:
ROBERT BENZ,
H. WIRT NEWKIRK.